(12) United States Patent
Miyazaki

(10) Patent No.: US 11,745,545 B2
(45) Date of Patent: Sep. 5, 2023

(54) PNEUMATIC TIRE

(71) Applicant: Toyo Tire Corporation, Itami (JP)

(72) Inventor: Tetsuji Miyazaki, Itami (JP)

(73) Assignee: TOYO TIRE CORPORATION, Itami (JP)

( * ) Notice: Subject to any disclaimer, the term of this patent is extended or adjusted under 35 U.S.C. 154(b) by 0 days.

(21) Appl. No.: 17/391,324

(22) Filed: Aug. 2, 2021

(65) Prior Publication Data

US 2022/0048334 A1 Feb. 17, 2022

(30) Foreign Application Priority Data

Aug. 17, 2020 (JP) ................................. 2020-137618

(51) Int. Cl.
*B60C 11/12* (2006.01)
*B60C 11/03* (2006.01)

(52) U.S. Cl.
CPC ...... *B60C 11/0304* (2013.01); *B60C 11/0302* (2013.01); *B60C 11/0306* (2013.01); *B60C 11/1204* (2013.01); *B60C 11/1236* (2013.01)

(58) Field of Classification Search
CPC ............. B60C 11/0304; B60C 11/0302; B60C 11/0306; B60C 11/1204; B60C 11/1236; B60C 11/11; B60C 2011/1245
See application file for complete search history.

(56) References Cited

U.S. PATENT DOCUMENTS

D348,864 S * 7/1994 Hashimura .................. D12/603

FOREIGN PATENT DOCUMENTS

| EP | 485884 A1 | * | 5/1992 | ............. B60C 11/11 |
| GB | 1514473 A | * | 6/1978 | ......... B60C 11/0304 |
| JP | 56131406 A | * | 10/1981 | ............. B60C 11/04 |
| JP | 11-310013 A | | 11/1999 | |
| SU | 1664598 A1 | * | 7/1991 | ............. B60C 11/00 |

OTHER PUBLICATIONS

Machine translation of JP56-131406 (no date).*

* cited by examiner

*Primary Examiner* — Justin R Fischer
*Assistant Examiner* — Philip N Schwartz
(74) *Attorney, Agent, or Firm* — WHDA, LLP

(57) ABSTRACT

A pneumatic tire includes: a first longitudinal groove and a second longitudinal groove extending in a tire circumferential direction; a first lateral groove extending obliquely with respect to a tire width direction and connected to the first longitudinal groove and the second longitudinal groove; a second lateral groove extending obliquely toward a side opposite to the first lateral groove with respect to a tire width direction and connected to the first longitudinal groove and the second longitudinal groove; and a trapezoidal block defined by the first longitudinal groove, the second longitudinal groove, the first lateral groove, and the second lateral groove. The block includes a first sipe and a second sipe extending obliquely toward opposite sides in the tire width direction.

7 Claims, 3 Drawing Sheets

PNEUMATIC TIRE

BACKGROUND OF THE INVENTION

Field of the Invention

The present disclosure relates to a pneumatic tire.

Description of the Related Art

A pneumatic tire having improved driving performance on snowy and icy road surfaces is known. For example, Patent Document 1 discloses a pneumatic tire including at least three circumferential grooves extending in a tire circumferential direction and an inclined lug groove extending in a direction inclined with respect to the tire circumferential direction and a tire width direction.

In the pneumatic tire of Patent Document 1, all the inclined lug grooves extend obliquely in the same direction, and a block defined by the circumferential groove and the inclined lug groove has a parallelogram shape. In such a parallelogram-shaped block, traction performance is greatly different between the direction in which the inclined lug groove extends and the direction intersecting with the inclined lug groove, and the traction performance has directionality.

PRIOR ART DOCUMENT

Patent Document

Patent Document 1: JP-A-11-310013

SUMMARY OF THE INVENTION

An object of the present disclosure is to provide a pneumatic tire capable of improving traction performance in all directions.

A pneumatic tire according to the present disclosure includes: a first longitudinal groove and a second longitudinal groove extending in a tire circumferential direction; a first lateral groove extending obliquely with respect to a tire width direction and connected to the first longitudinal groove and the second longitudinal groove; a second lateral groove extending obliquely toward a side opposite to the first lateral groove with respect to the tire width direction and connected to the first longitudinal groove and the second longitudinal groove; and a trapezoidal block defined by the first longitudinal groove, the second longitudinal groove, the first lateral groove, and the second lateral groove. The block includes a first sipe and a second sipe extending obliquely toward opposite sides in the tire width direction.

DETAILED DESCRIPTION OF THE PREFERRED EMBODIMENTS

Figure 1:
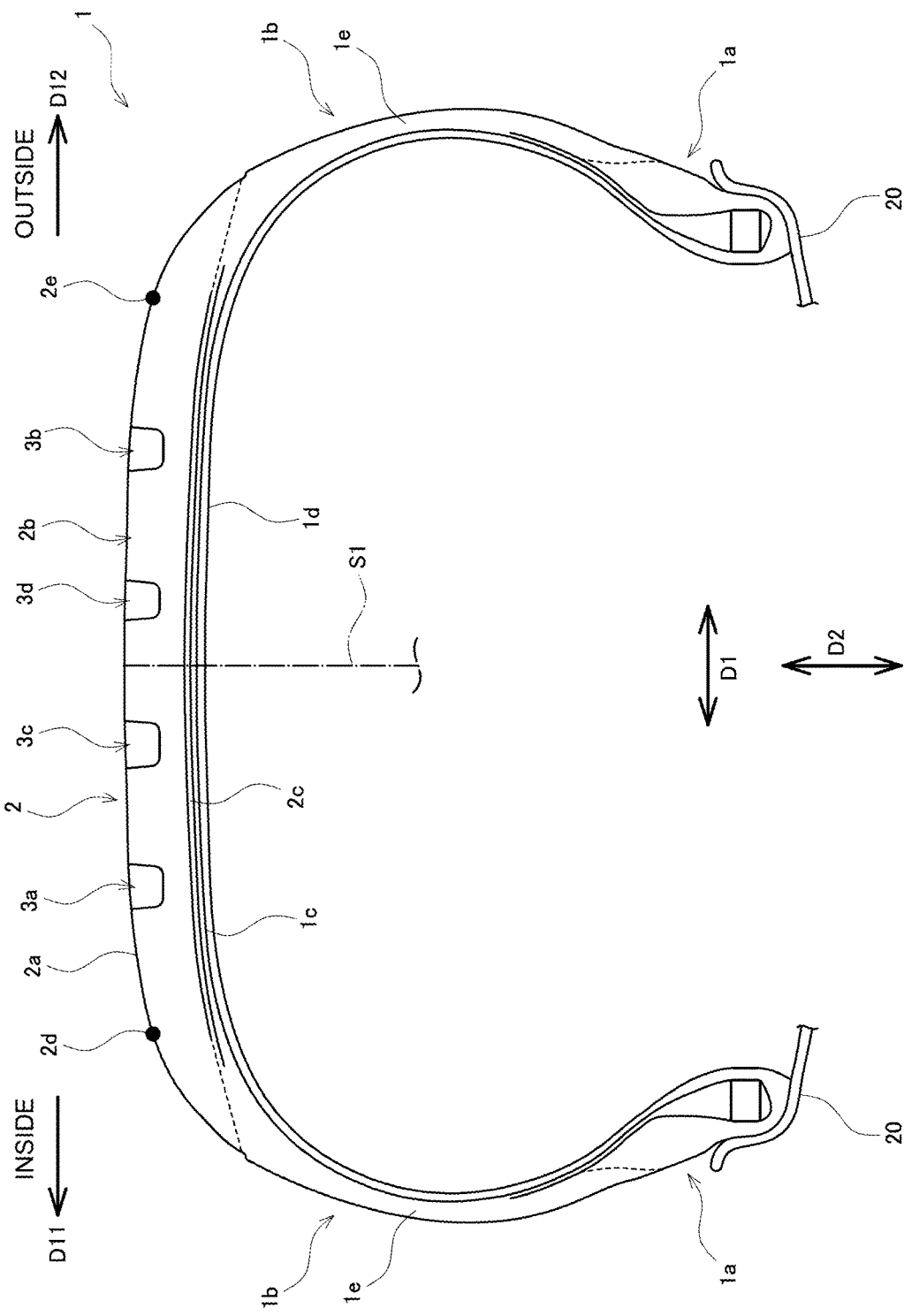
FIG. 1 is a cross-sectional view of a main part of a pneumatic tire according to an embodiment on a tire meridian plane.

Hereinafter, an embodiment of a pneumatic tire will be described with reference to FIGS. 1 to 3. Note that a dimensional ratio of the drawing does not necessarily coincide with an actual dimensional ratio in each of the drawings, and dimensional ratios in the respective drawings do not necessarily coincide with each other.

In each of the drawings, a first direction D1 is a tire width direction D1 parallel to a tire rotation shaft that is a rotation center of a pneumatic tire (hereinafter, also simply referred to as a "tire") 1, a second direction D2 is a tire radial direction D2 being a diameter direction of the tire 1, and a third direction D3 is a tire circumferential direction D3 around the tire rotation shaft.

In the tire width direction D1, the inner side is a side close to a tire equatorial plane S1, and the outer side is a side far from the tire equatorial plane S1. In the tire width direction D1, a first side D11 is also referred to as a first width direction side D11, and a second side D12 is also referred to as a second width direction side D12. In the tire radial direction D2, the inner side is a side close to the tire rotation shaft, and the outer side is a side far from the tire rotation shaft.

The tire equatorial plane S1 is a plane orthogonal to the tire rotation shaft and located at the center of the tire 1 in the tire width direction D1, and the tire meridian plane is a plane including the tire rotation shaft and orthogonal to the tire equatorial plane S1. The tire equator line is a line along which an outer surface (a tread surface 2a to be described later) of the tire 1 in the tire radial direction D2 intersects with the tire equatorial plane S1.

As illustrated in FIG. 1, a tire 1 according to the present embodiment includes a pair of beads 1a having a bead core, sidewalls 1b extending outward in the tire radial direction D2 from the respective beads 1a, and a tread 2 connected to the outer ends of the pair of sidewalls 1b in the tire radial direction D2 and having the outer surface in the tire radial direction D2 which is in contact with a road surface. In the present embodiment, the tire 1 is a pneumatic tire 1, in which air is introduced, and is mounted on a rim 20.

Further, the tire 1 includes a carcass 1c stretched between a pair of bead cores, and an inner liner 1d disposed inside the carcass 1c and having an excellent function of preventing permeation of gas in order to maintain the air pressure. The carcass 1c and the inner liner 1d are disposed along the tire inner circumference over the bead 1a, the sidewall 1b, and the tread 2.

The tire 1 has a structure asymmetric with respect to the tire equatorial plane S1. In the present embodiment, the tire 1 is a tire for which the following are designated: a direction in which the tire is mounted on the vehicle; and which of the right and left sides of the tire 1 faces the vehicle at the time of mounting on the rim 20. Note that a tread pattern formed on the tread surface 2a of the tread 2 has a shape asymmetric with respect to the tire equatorial plane S1.

The direction of the mounting on the vehicle is displayed on the sidewall 1b. Specifically, the sidewall 1b includes a sidewall rubber 1e disposed outside the carcass 1c in the tire width direction D1 so as to constitute a tire outer surface, and the sidewall rubber 1e has a display portion (not illustrated) that displays the direction of the mounting on the vehicle on the surface.

For example, one sidewall 1b disposed on the inner side (hereinafter also referred to as "vehicle inner side") during the mounting on the vehicle has a display (e.g., "INSIDE", etc.) indicating the vehicle inner side. Further, for example, the other sidewall 1b disposed on the outer side (hereinafter also referred to as "vehicle outer side") during the mounting on the vehicle has a display (e.g., "OUTSIDE", etc.) indicating the vehicle outer side. In the present embodiment, the first width direction side D11 is the vehicle inner side, and the second width direction side D12 is the vehicle outer side.

The tread 2 includes a tread rubber 2b having a tread surface 2a being in contact with the road surface, and a belt 2c disposed between the tread rubber 2b and the carcass 1c. The tread surface 2a has a ground-contacting surface that is actually in contact with the road surface, and the outer ends of the ground-contacting surface in the tire width direction D1 are referred to as ground-contacting ends 2d, 2e. Note that the ground-contacting surface refers to a tread surface 2a that is in contact with a flat load surface when the tire 1 is mounted on the normal rim 20, the tire 1 is placed perpendicularly to the road surface in a state where the tire 1 is filled with a normal internal pressure, and a normal load is applied.

In a standard system including a standard on which the tire 1 is based, the normal rim 20 is a rim 20 defined for each tire 1 by the standard and is, for example, a standard rim in the case of the Japan Automobile Tyre Manufacturers Association (JATMA), "Design Rim" in the case of the Tire and Rim Association, Inc. (TRA), or "Measuring Rim" in the case of the European Tyre and Rim Technical Organisation (ETRTO).

The normal internal pressure is an air pressure defined for each tire 1 by each standard in the standard system including the standard on which the tire 1 is based. The normal internal pressure is the maximum air pressure in the case of JATMA, the maximum value described in Table "TIRE LOAD LIMITS AT VARIOUS COLD INFLATION PRESSURES" in the case of TRA, and "INFLATION PRESSURE" in the case of ETRTO, and when the tire 1 is for a passenger car, the normal internal pressure is set to 180 kPa.

The normal load is a load defined for each tire 1 by each standard in the standard system including the standard on which the tire 1 is based. The normal load is the maximum load capacity in the case of JATMA, the maximum value described in the above table in the case of TRA, and "LOAD CAPACITY" in the case of ETRTO, and when the tire 1 is for a passenger car, the normal load is 85% of the corresponding load of the internal pressure of 180 kPa.

Figure 2:
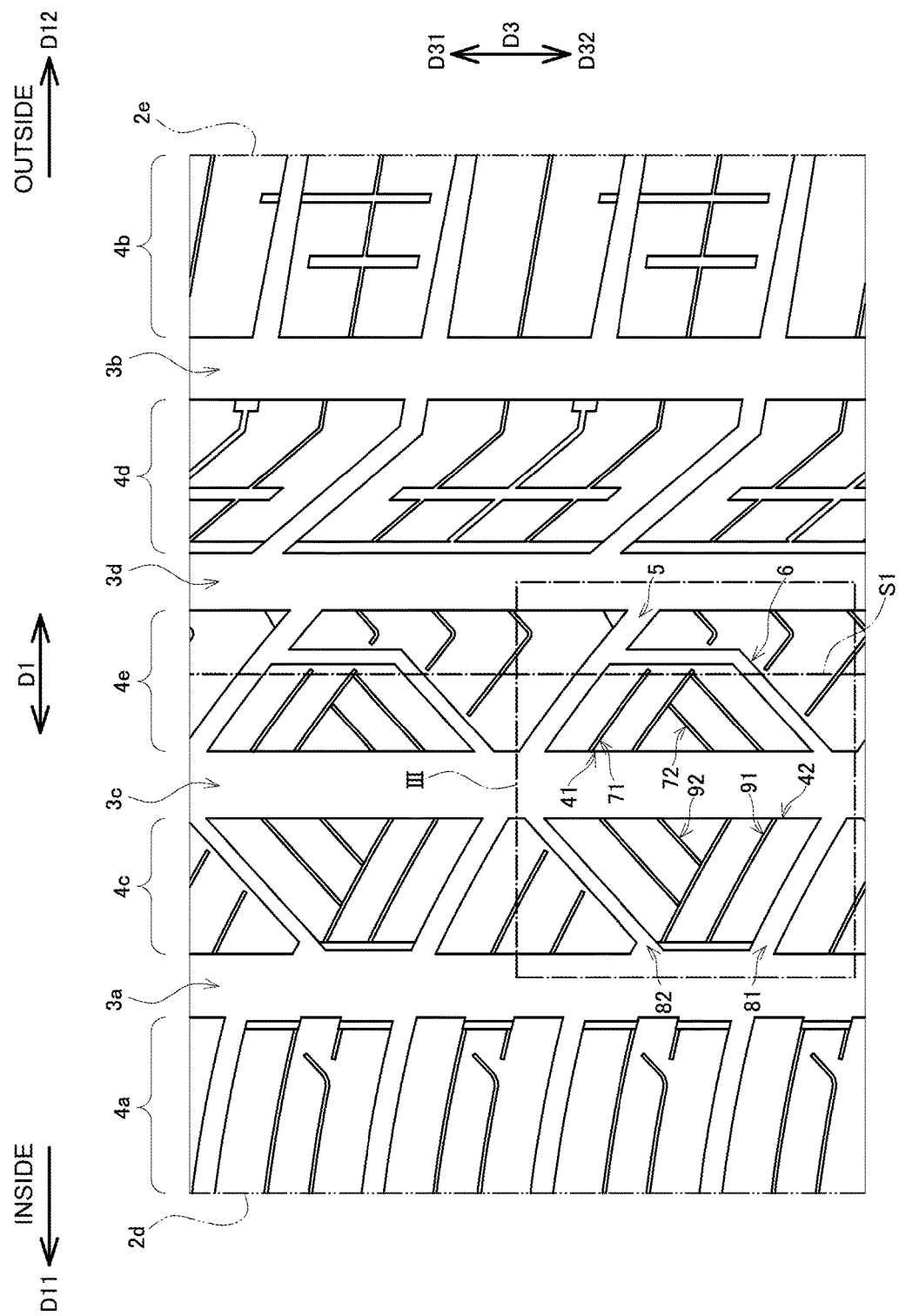
FIG. 2 is a developed view of a main part of a tread surface of the pneumatic tire according to the embodiment.
Figure 3:
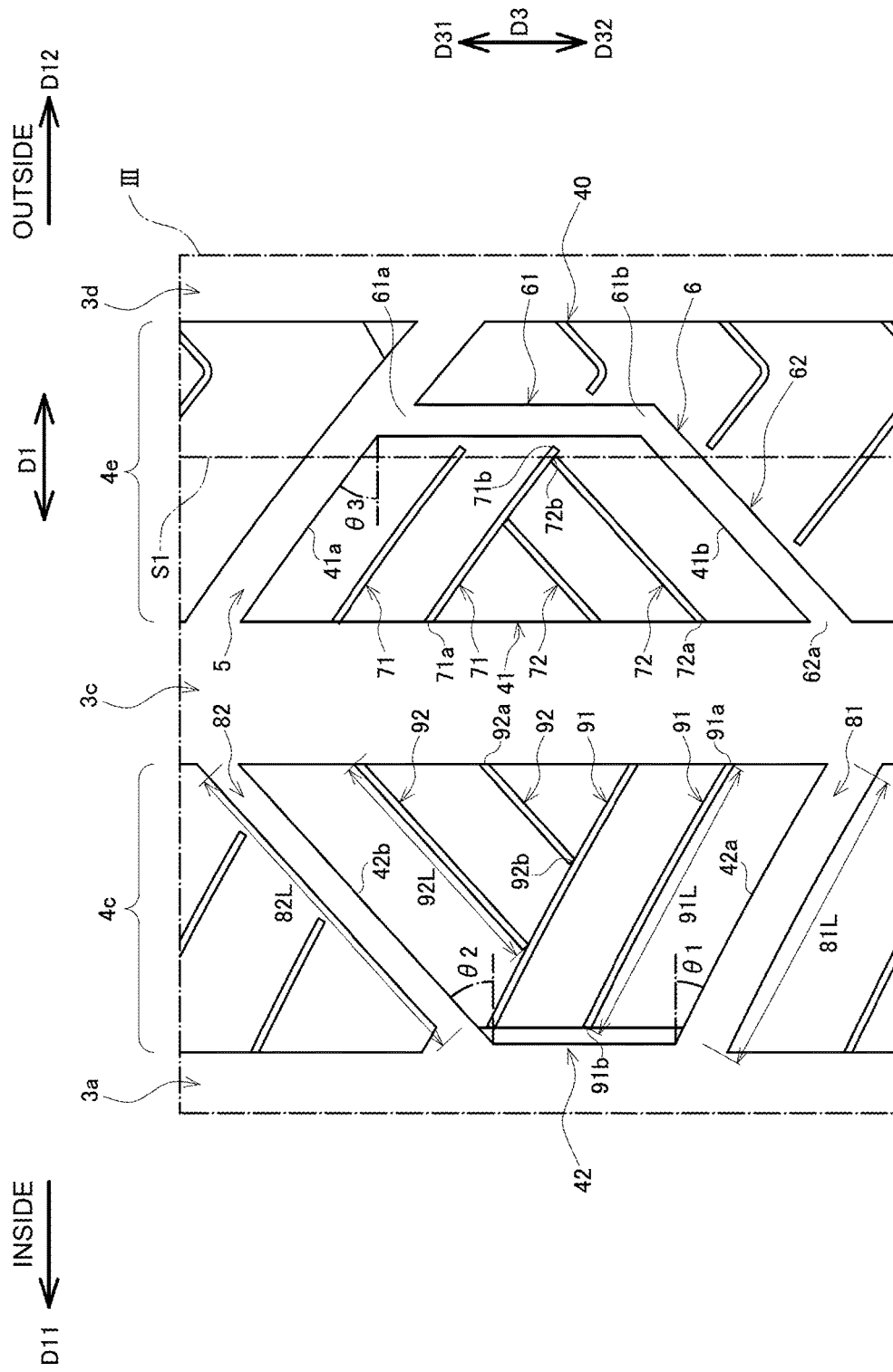
FIG. 3 is an enlarged view of a region III of the tread surface illustrated in FIG. 2.

As illustrated in FIGS. 1 and 2, the tread rubber 2b includes a plurality of main grooves 3a to 3d extending in the tire circumferential direction D3. The main grooves 3a to 3d extend continuously in the tire circumferential direction D3. In the present embodiment, the main grooves 3a to 3d extend in a straight shape along the tire circumferential direction D3, but the present invention is not limited to such a configuration. For example, at least one main groove may extend in a zigzag shape by repeating refraction, or for example, at least one main groove may extend in a wave shape by repeating curvature.

The main grooves 3a to 3d may include, for example, a portion that is a so-called tread wear indicator (not illustrated) where the groove has been made shallow such that the degree of wear can be seen by exposure accompanied by wear. For example, the main grooves 3a to 3d may have a groove width of 3% or more of the distance (dimension in the tire width direction D1) between the ground-contacting ends 2d, 2e. For example, the main grooves 3a to 3d may have a groove width of 5 mm or more.

The pair of main grooves 3a, 3b disposed on the outermost side in the tire width direction D1 is referred to as shoulder main grooves 3a, 3b, and the main grooves 3c, 3d disposed between the pair of shoulder main grooves 3a, 3b are referred to as center main grooves 3c, 3d. Although the number of the main grooves 3a to 3d is not particularly limited, the number is four in the present embodiment.

The tread rubber 2b includes a plurality of lands 4a to 4e defined by the plurality of main grooves 3a to 3d and the pair of ground-contacting ends 2d, 2e. Although the number of the lands 4a to 4e is not particularly limited, but the number is five in the present embodiment.

The lands 4a, 4b defined by the shoulder main grooves 3a, 3b and the ground-contacting ends 2d, 2e are referred to as shoulder lands 4a, 4b, and the lands 4c to 4e defined by the pair of adjacent main grooves 3a to 3d are referred to as middle lands 4c to 4e. Note that the lands 4c, 4d defined by the shoulder main grooves 3a, 3b and the center main grooves 3c, 3d are also referred to as quarter lands (also referred to as "mediate lands") 4c and 4d, and the land 4e defined by the pair of center main grooves 3c, 3d is also referred to as a center land 4e.

The quarter land 4c has a first inclined groove 81 extending obliquely with respect to the tire width direction D1. The first inclined groove 81 is connected to the main groove 3a and the main groove 3c and is open to the main groove 3a and the main groove 3c. The quarter land 4c has a second inclined groove 82 extending obliquely toward the side opposite to the first inclined groove 81 with respect to the tire width direction D1. The second inclined groove 82 is connected to the main groove 3a and the main groove 3c and is open to the main groove 3a and the main groove 3c. Thereby, the quarter land 4c has a plurality of trapezoidal quarter blocks 42 divided by the first inclined groove 81 and the second inclined groove 82. It can also be said that the quarter block 42 is defined by the main groove 3a, the main groove 3c, the first inclined groove 81, and the second inclined groove 82. That is, the main groove 3a is an example of a first longitudinal groove of the present invention, the main groove 3c is an example of a second longitudinal groove of the present invention, the first inclined groove 81 is an example of a first lateral groove of the present invention, and the second inclined groove 82 is an example of a second lateral groove of the present invention.

By inclining a block end 42a and a block end 42b of the quarter block 42 in the tire circumferential direction D3 to the opposite sides with respect to the tire width direction D1, at least one of the block end 42a and the block end 42b functions as a traction element in all directions of front, rear, right, and left, so that the traction performance in all the directions can be improved.

An inclination angle θ1 of the first inclined groove 81 with respect to the tire width direction D1 is smaller than an inclination angle θ2 of the second inclined groove 82 with respect to the tire width direction D1. Thereby, a length 81L of the first inclined groove 81 is smaller than a length 82L of the second inclined groove 82. Note that the inclination angle θ1 is an angle at a corner where the first inclined groove 81 intersects with the main groove 3a, and the inclination angle θ2 is an angle at a corner where the second inclined groove 82 intersects with the main groove 3a. The inclination angle θ1 is, for example, 20 to 70 degrees, and the inclination angle θ2 is, for example, 20 to 70 degrees.

The groove width of the first inclined groove 81 is, for example, 2 to 6 mm, and the groove width of the first inclined groove 81 of the present embodiment is 4 mm. The groove depth of the first inclined groove 81 is, for example, 5 to 10 mm, and the groove depth of the first inclined groove 81 of the present embodiment is 7 mm.

The groove width of the second inclined groove 82 is, for example, 1.8 to 4 mm, and the groove width of the second inclined groove 82 of the present embodiment is 2.5 mm. The groove depth of the second inclined groove 82 is, for example, 1.5 to 10 mm, and the groove depth of the second inclined groove 82 of the present embodiment is 6.5 mm.

The quarter block 42 includes a first sipe 91 and a second sipe 92 extending obliquely to opposite sides with respect to the tire width direction D1. By inclining the first sipe 91 and the second sipe 92 to the opposite sides with respect to the tire width direction D1, at least one of the first sipe 91 and the second sipe 92 functions as a traction element in all directions of front, rear, right, and left, so that the traction performance in all the directions can be improved. In the present specification, the "sipe" means a groove having a width dimension of less than 1.6 mm on the tread surface 2a.

The quarter block 42 of the present embodiment has two first sipes 91 and two second sipes 92. The groove width of each of the first sipe 91 and the second sipe 92 is 1 mm or less.

The first sipe 91 is not open to the first inclined groove 81. It is thereby possible to prevent a decrease in the rigidity of the quarter block 42 due to the first sipe 91. Specifically, the first sipe 91 extends in parallel with the first inclined groove 81 and has one end 91a open to the main groove 3c and the other end 91b open to the main groove 3a. Note that "parallel" includes not only the case of being completely parallel but also the case of being substantially parallel with the intersection angle being 5 degrees or less (the same applies hereinafter).

The interval between the first sipe 91 and the first inclined groove 81 is substantially the same as the interval between the adjacent first sipes 91. This improves the rigidity balance in the quarter block 42.

The second sipe 92 is not open to the second inclined groove 82. It is thereby possible to prevent a decrease in the rigidity of the quarter block 42 due to the second sipe 92. Specifically, the second sipe 92 extends in parallel with the second inclined groove 82 and has one end 92a open to the main groove 3c and the other end 92b terminated in the quarter block 42. That is, the other end 92b of the second sipe 92 is separated from the main groove 3a.

The interval between the second sipe 92 and the second inclined groove 82 is substantially the same as the interval between the adjacent second sipes 92. This improves the rigidity balance in the quarter block 42.

The other end 92b of the second sipe 92 is butted against the first sipe 91. The other ends 92b of the two second sipes 92 are each butted against the central portion of one first sipe 91. Hence it is possible to prevent a local increase in ground pressure at the other end 92b of the second sipe 92 and to make the ground pressure uniform.

A length 91L of the first sipe 91 is larger than a length 92L of the second sipe 92. On the other hand, the length 81L of the first inclined groove 81 parallel to the first sipe 91 is smaller than the length 82L of the second inclined groove 82 parallel to the second sipe 92. As a result, the total length of the lengths 91L of the two first sipes 91 and the length 81L of the first inclined groove 81 is close to the total length of the lengths 92L of the two second sipes 92 and the length 82L of the second inclined groove 82, so that the traction elements are disposed in a well-balanced manner as a whole in the quarter block 42.

The center land 4e has a plurality of third inclined grooves 5 extending obliquely toward the same side with respect to the tire circumferential direction D3. The third inclined groove 5 is connected to the main groove 3c and the main groove 3d and is open to the main groove 3c and the main groove 3d. Thereby, the center land 4e has a plurality of center blocks 40 divided by the third inclined groove 5. It can also be said that the center block 40 is defined by the main groove 3c, the main groove 3d, and the two third inclined grooves 5. The groove width of the third inclined groove 5 is, for example, 2 to 6 mm, and the groove width of the third inclined groove 5 of the present embodiment is 3.5 mm. The groove depth of the third inclined groove 5 is, for example, 5 to 10 mm, and the groove depth of the third inclined groove 5 of the present embodiment is 7 mm. The inclination angle θ3 of the third inclined groove 5 with respect to the tire width direction D1 is, for example, 20 to 70 degrees.

The center block 40 includes a sub groove 6. The sub groove 6 includes a first portion 61 extending in the tire circumferential direction D3 and a second portion 62 extending obliquely with respect to the tire circumferential direction D3.

The first portion 61 is open, at a first opening 61a, to an intermediate portion of the third inclined groove 5 on a first circumferential direction side D31 out of the two third inclined grooves 5 defining the center block 40. The first portion 61 extends from the first opening 61a to a second circumferential direction side D32 and terminates at a terminal end 61b in the center block 40. The first portion 61 is located on the second width direction side D12 with respect to the tire equatorial plane S1 in the tire width direction D1.

The second portion 62 extends obliquely toward the side opposite to the third inclined groove 5 with respect to the tire circumferential direction D3. In addition, the second portion 62 extends in a direction away from the third inclined groove 5 on the first circumferential direction side D31 (a direction approaching the third inclined groove 5 on the second circumferential direction side D32) from the terminal end 61b of the first portion 61 and is open to the main groove 3c at the second opening 62a. The second portion 62 extends across the tire equatorial plane S1.

Since the sub groove 6 is open only to one third inclined groove 5 of the two third inclined grooves 5 defining the center block 40 and not configured to completely penetrate the center block 40 in the tire circumferential direction D3, the drainage properties can be improved while the block rigidity of the center block 40 is maintained. In addition, since the third inclined groove 5 and the second portion 62 of the sub groove 6 each extend obliquely to the opposite side and are open to the main groove 3c, it is possible to obtain drainage properties independent of the rotation direction.

The groove width of the first portion 61 is, for example, 1.8 to 4 mm, and the groove width of the first portion 61 of the present embodiment is 2.5 mm. The groove width of the second portion 62 is, for example, 1.8 to 4 mm, and the groove width of the second portion 62 of the present embodiment is 2.5 mm.

The center block 40 includes a trapezoidal block 41 defined by the main groove 3c, the third inclined groove 5 on the first circumferential direction side D31, and the sub groove 6. The main groove 3c and the first portion 61 of the sub groove 6 extend in the tire circumferential direction D3. The third inclined groove 5 extends obliquely with respect to the tire width direction D1 and is connected to the main groove 3c and the first portion 61 of the sub groove 6. In addition, the second portion 62 of the sub groove 6 extends obliquely toward the side opposite to the third inclined groove 5 with respect to the tire width direction D1 and is connected to the main groove 3c and the first portion 61 of the sub groove 6. As a result, the trapezoidal block 41 is defined by the main groove 3c, the first portion 61 of the sub groove 6, the third inclined groove 5 on the first circumferential direction side D31, and the second portion 62 of the sub groove 6. That is, the first portion 61 of the sub groove 6 is an example of a first longitudinal groove of the present invention, the main groove 3c is an example of a second longitudinal groove of the present invention, the third inclined groove 5 on the first circumferential direction side D31 is an example of a first lateral groove of the present invention, and the second portion 62 of the sub groove 6 is an example of a second lateral groove of the present invention.

By inclining a block end 41a and a block end 41b of the trapezoidal block 41 in the tire circumferential direction D3 to the opposite sides with respect to the tire width direction D1, at least one of the block end 41a and the block end 41b functions as a traction element in all directions of front, rear, right, and left, so that the traction performance in all the directions can be improved.

The trapezoidal block 41 includes a first sipe 71 and a second sipe 72 extending obliquely to opposite sides with respect to the tire width direction D1. By inclining the first sipe 71 and the second sipe 72 to the opposite sides with respect to the tire width direction D1, at least one of the first sipe 71 and the second sipe 72 functions as a traction element in all directions of front, rear, right, and left, so that the traction performance in all the directions can be improved.

The trapezoidal block 41 of the present embodiment has two first sipes 71 and two second sipes 72. The groove width of each of the first sipe 71 and the second sipe 72 is 1 mm or less.

The first sipe 71 is not open to the third inclined groove 5. It is thereby possible to prevent a decrease in the rigidity of the trapezoidal block 41 due to the first sipe 71. Specifically, the first sipe 71 extends in parallel with the third inclined groove 5 and has one end 71a open to the main groove 3c and the other end 71b terminated in the trapezoidal block 41. That is, the other end 71b of the first sipe 71 is separated from the first portion 61 of the sub groove 6. Thus, the block rigidity of the trapezoidal block 41 can be ensured.

The interval between the first sipe 71 and the third inclined groove 5 is substantially the same as the interval between the adjacent first sipes 71. This improves the rigidity balance in the trapezoidal block 41.

The second sipe 72 is not open to the second portion 62 of the sub groove 6. It is thereby possible to prevent a decrease in the rigidity of the trapezoidal block 41 due to the second sipe 72. Specifically, the second sipe 72 extends in parallel with the second portion 62 of the sub groove 6 and has one end 72a open to the main groove 3c and the other end 72b terminated in the trapezoidal block 41. That is, the other end 72b of the second sipe 72 is separated from the first portion 61 of the sub groove 6. Thus, the block rigidity of the trapezoidal block 41 can be ensured.

The interval between the second sipe 72 and the second portion 62 is substantially the same as the interval between the adjacent second sipes 72. This improves the rigidity balance in the trapezoidal block 41.

The other end 72b of the second sipe 72 is butted against the first sipe 71. The other ends 72b of the two second sipes 72 are butted against the other ends 71b and the central portion of the one first sipe 71, respectively. Hence it is possible to prevent a local increase in ground pressure at the other end 72b of the second sipe 72 and to make the ground pressure uniform.

The trapezoidal block 41 is disposed to face the trapezoidal quarter block 42 with the main groove 3c interposed therebetween and has a substantially hexagonal shape as a whole in which the trapezoidal block 41 and the quarter block 42 are combined. An opening where the second inclined groove 82 is open to the main groove 3c and an opening where the third inclined groove 5 is open to the main groove 3c face each other in the tire width direction D1. An opening where the first inclined groove 81 is open to the main groove 3c and the second opening 62a where the sub groove 6 is open to the main groove 3c face each other in the tire width direction D1. The first sipe 71 in the trapezoidal block 41 and the first sipe 91 in the quarter block 42 are located in point symmetry, and the second sipe 72 in the trapezoidal block 41 and the second sipe 92 in the quarter block 42 are located in point symmetry. As a result, traction elements are disposed in a balanced manner as a whole in which the trapezoidal block 41 and the quarter block 42 are combined.

As described above, the pneumatic tire (1) according to the present embodiment includes: a first longitudinal groove (3a; 61) and a second longitudinal groove (3c) extending in a tire circumferential direction (D3); a first lateral groove (81; 5) extending obliquely with respect to a tire width direction (D1) and connected to the first longitudinal groove (3a; 61) and the second longitudinal groove (3c); a second lateral groove (82; 62) extending obliquely toward a side opposite to the first lateral groove (81; 5) with respect to the tire width direction (D1) and connected to the first longitudinal groove (3a; 61) and the second longitudinal groove (3c); and a trapezoidal block (42; 41) defined by the first longitudinal groove (3a; 61), the second longitudinal groove (3c), the first lateral groove (81; 5), and the second lateral groove (82; 62). The block (42; 41) includes a first sipe (91; 71) and a second sipe (92; 72) extending obliquely toward opposite sides in the tire width direction (D1).

By inclining a block end (42a; 41a) and a block end (42b; 41b) of the trapezoidal block (42; 41) in the tire circumferential direction (D3) to the opposite sides with respect to the tire width direction (D1), at least one of the block end (42a; 41a) and the block end (42b; 41b) functions as a traction element in all directions of front, rear, right, and left, so that the traction performance in all the directions can be improved. Further, by inclining the first sipe (91; 71) and the second sipe (92; 72) to the opposite sides with respect to the tire width direction (D1), at least one of the first sipe (91; 71) and the second sipe (92; 72) functions as a traction element in all directions of front, rear, right, and left, so that the traction performance in all the directions can be improved. As a result, according to the pneumatic tire (1), the traction performance in all the directions can be improved.

As in the present embodiment, the first sipe (91; 71) may be parallel to a first lateral groove (81; 5), and a second sipe (92; 72) may be parallel to a second lateral groove (82; 62).

With this configuration, it is possible to prevent a decrease in the rigidity of the trapezoidal block (42; 41) due to the first sipe (91; 71) and the second sipe (92; 72).

As in the present embodiment, the second sipe (92; 72) may extend toward the first sipe (91; 71) and may be butted against the first sipe (91; 71).

With this configuration, it is possible to prevent a local increase in ground pressure at the other end (92b; 72b) of the second sipe (92; 72) and to make the ground pressure uniform.

Note that the pneumatic tire 1 is not limited to the configuration of the embodiment described above and is not limited to the operation and effect described above. It is needless to say that various modifications can be made to the pneumatic tire 1 within a range not departing from the gist of the present invention. For example, the configuration, the method, and the like of each of the plurality of embodiments described above may be arbitrarily adopted and combined, and it is a matter of course that one or more configurations, methods, and the like according to various modification examples described below may be arbitrarily selected and adopted in the configuration, method, and the like according to the embodiment described above.

(1) In the above embodiment, two first sipes 91 and two second sipes 92 are provided, but one first sipe 91 and one second sipe 92, or three or more first sipes 91 and three or more second sipes 92 may be provided. Similarly, in the above embodiment, two first sipes 71 and two second sipes 72 are provided, but one first sipe 71 and one second sipe 72, or three or more first sipes 71 and three or more second sipes 72 may be provided.

(2) In the above embodiment, the first sipe 91 is parallel to the first inclined groove 81, and the second sipe 92 is parallel to the second inclined groove 82, but the present invention is not limited thereto. Similarly, in the above embodiment, the first sipe 71 is parallel to the third inclined groove 5, and the second sipe 72 is parallel to the second portion 62 of the sub groove 6, but the present invention is not limited thereto.

(3) In the above embodiment, the first sipe 91 and the second sipe 92 are linear, but the present invention is not limited thereto.

What is claimed is:

1. A pneumatic tire comprising:
   a first longitudinal groove, a second longitudinal groove and a center main groove extending in a tire circumferential direction, wherein the first longitudinal groove is located between the second longitudinal groove and the center main groove;
   a center land defined by the second longitudinal groove and the center main groove;
   a first lateral groove extending obliquely with respect to a tire width direction and connected to the second longitudinal groove and the center main groove;
   a second lateral groove extending obliquely toward a side opposite to the first lateral groove with respect to a tire width direction and connected to the first longitudinal groove and the second longitudinal groove; and
   wherein the center land includes a trapezoidal block defined by the first longitudinal groove, the second longitudinal groove, the first lateral groove, and the second lateral groove, wherein the second lateral groove extends across a tire equatorial plane, the tire equatorial plane being a plane orthogonal to a tire rotation shaft and located at a center of the tire in the tire width direction,
   wherein the trapezoidal block includes a first sipe and a second sipe extending obliquely toward opposite sides in the tire width direction, and
   the first longitudinal groove extends from a first opening positioned at an intermediate portion of the first lateral groove on a first circumferential direction side to a second circumferential direction side and terminates at a terminal end in the center land.

2. The pneumatic tire according to claim 1, wherein the first sipe is parallel to the first lateral groove, and the second sipe is parallel to the second lateral groove.

3. The pneumatic tire according to claim 1, wherein the second sipe extends toward the first sipe and is butted against the first sipe.

4. The pneumatic tire according to claim 1, wherein an inclination angle of the first inclined groove with respect to the tire width direction is smaller than an inclination angle of the second inclined groove with respect to the tire width direction.

5. The pneumatic tire according to claim 4, wherein
   the first sipe is parallel to the first lateral groove, and the second sipe is parallel to the second lateral groove, and
   a length of the first sipe is larger than a length of the second sipe, and a length of the first inclined groove is smaller than a length of the second inclined groove.

6. The pneumatic tire according to claim 2, wherein
   the trapezoidal block includes a plurality of the first sipes and a plurality of the second sipes,
   an interval between the first sipe and the first inclined groove is substantially equal to an interval between the first sipes adjacent to each other, and
   an interval between the second sipe and the second inclined groove is substantially equal to an interval between the second sipes adjacent to each other.

7. The pneumatic tire according to claim 1, comprising:
   a plurality of main grooves extending in the tire circumferential direction; and
   the center land and a quarter land defined by the plurality of main grooves,
   wherein
   the trapezoidal block included in the center land is disposed to face the trapezoidal block included in the quarter land across the main groove between the center land and the quarter land, and
   a total shape of the trapezoidal block included in the center land and a trapezoidal block included in the quarter land is substantially hexagonal.

* * * * *